Dec. 6, 1955        J. DOLZA        2,725,862
MANIFOLD HEAT CONTROL VALVE
Filed June 18, 1953        2 Sheets-Sheet 1

INVENTOR
John Dolza
BY
ATTORNEY

Dec. 6, 1955    J. DOLZA    2,725,862
MANIFOLD HEAT CONTROL VALVE
Filed June 18, 1953    2 Sheets-Sheet 2

INVENTOR
John Dolza
BY
ATTORNEY

United States Patent Office 2,725,862
Patented Dec. 6, 1955

2,725,862

MANIFOLD HEAT CONTROL VALVE

John Dolza, Davisburg, Mich., assignor to General Motors Corporation, Detroit, Mich., a corporation of Delaware Application June 18, 1953, Serial No. 362,536

19 Claims. (Cl. 123—122)

This invention relates to engines generally and in particular to manifold heat control valves employed within the exhaust systems of internal combustion engines.

For greater ease in starting engines during cold weather, pre-heating of the combustible charge is generally provided for by causing the engine exhaust gases to flow about the engine induction system. Continuous heating of the combustible charge after the engine has reached normal operating temperatures has been found to be detrimental to the volumetric efficiency of the engine and requires therefore that means be employed for directing the flow of heat about the induction system only when the engine is cold and for allowing for immediate exhaust from the engine at all other times. Such means are usually in the form of a flapper or butterfly type valve mounted within a portion of the exhaust system. These valves are constantly exposed to the excessive heat of exhaust gases and the corrosive effect of the condensate from such gases and have heretofore required the use of expensive materials and intricate castings designed to eliminate these adverse effects and to provide a suitable valve structure.

It is now proposed to provide a valve structure for use within the exhaust system of an engine, or in other similar systems, which will withstand higher temperatures, operate more efficiently, and have a longer serviceable life than valves previously employed for similar purposes. It is an object of this invention to provide a valve which may be made of less expensive materials, more easily assembled, and which may be more readily adapted for use. It is a still further object of this invention to provide a means of cooling the entire valve structure and consequently any bearing means employed therewith. A still further object of this invention is to provide a new and novel means for cooling valves of this sort and for providing for the transfer of the heat incident thereto away from the valve structure for more functional use elsewhere. Towards this latter end it is proposed to have temperature responsive control means adaptable for association with the proposed valve structure to receive the transferred heat therefrom for the actuation of such control means.

Figure 1:
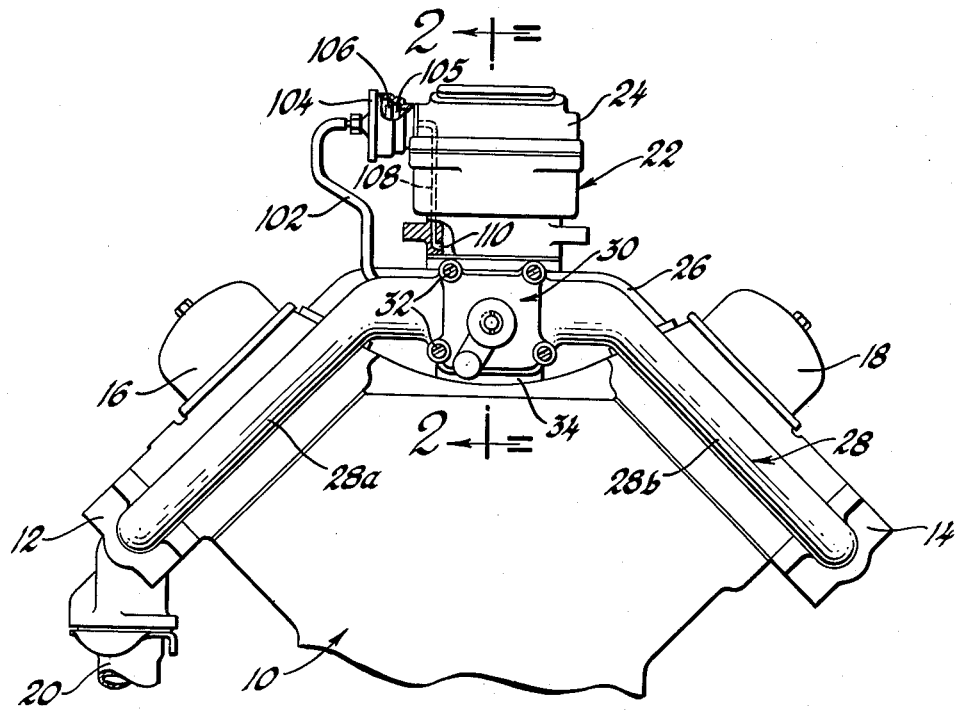
Figure 1 is an end view of a V-type engine having the present invention incorporated therein.
Figure 2:
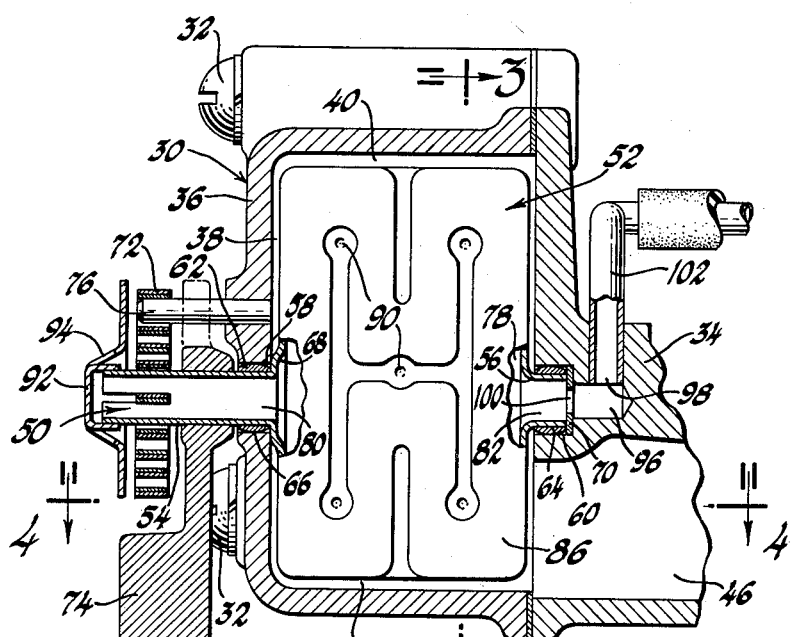
Figure 2 is a cross sectional side view of the present invention as viewed in the plane of line 2—2 of Figure 1 in the direction of the arrows thereon.
Figure 3:
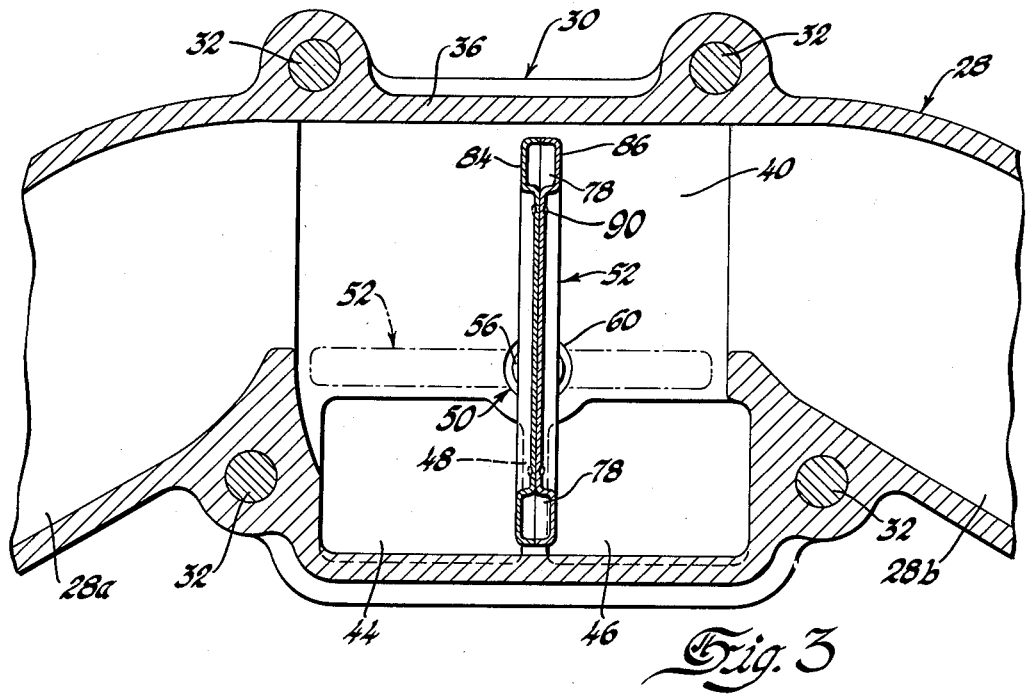
Figure 3 is a cross sectional view of Figure 2 taken in the plane of line 3—3 as viewed in the direction of the arrows thereon.
Figure 4:
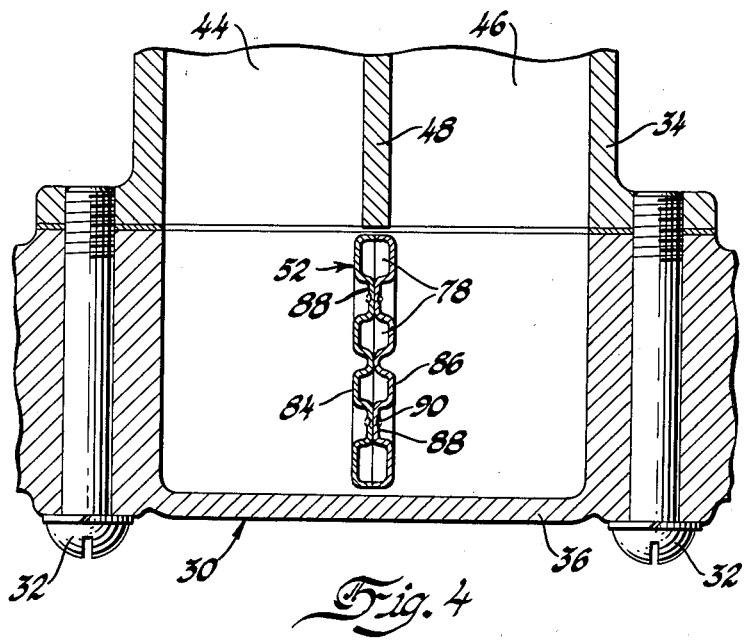
Figure 4 is a cross sectional view of Figure 2 taken in the plane of line 4—4 as viewed in the direction of the arrows thereon.

The V-type engine 10 shown in Figure 1 has exhaust manifolds 12 and 14 adjacent each bank of engine cylinders 16 and 18. An exhaust manifold outlet 20 is provided in the manifold 12 for the exhaust of engine gases therefrom. An induction system 22 is disposed between the engine cylinders 16 and 18 and comprises an engine carburetor 24 and intake manifold 26. A cross-over conduit 28 is connected to the exhaust manifolds 12 and 14 and extends across the end of the engine 10 for the exhaust of engine gases from the manifold 14, through the manifold 16, and out the outlet 20. A heat control device 30, embodying the principles of this invention is incorporated within the conduit 28 and is disposed adjacent the induction system 22. The heat control device 30 and associated conduit 28 are secured by bolts or other fastening means 32 to a passage member 34 extending in heat exchanging relation about the intake manifold 26.

The heat control device 30 comprises a housing 36 having a chamber 38 formed therein. The upper portion 40 of the chamber 38 is in communication with the exhaust manifolds 12 and 14 through the exhaust conduit 28. In the present embodiment, and for greater ease in manufacturing and assembly, the exhaust conduit 28 is formed integral with the housing 36. However, the device may be made adaptable to receive separate exhaust conduits, as for example 28a and 28b, on either side thereof. The lower portion 42 of the chamber 38 communicates with passages 44 and 46 formed in the passage member 34 and separated by dividing wall 48. A flapper or butterfly type valve structure 50 is mounted within the chamber 38 and comprises a valve plate 52 transversely disposed across the chamber. Shafts 54 and 56 formed on the valve plate 52 are received within an opening 58, provided through the front of the housing 36, and a recess 60 provided in the passage member 34. Spherical bearings 62 and 64 are secured to the valve shafts 54 and 56 and within the opening 58 and the recess 60 to provide a line-contact bearing surface 66. Axial positioning of the valve plate 52 within the chamber 38 is determined by a shoulder 68 formed about the shaft 54 within the chamber and an end bearing 70 disposed within the recess 60. A bimetal element 72 and a counterweight 74 are secured to the valve shaft 54 and co-act with a stop-positioning post 76 secured to the housing 36 to control the position of the valve plate 52 within the chamber.

Passages 78, 80 and 82 are formed through the valve plate 52 and the valve shafts 54 and 56 respectively. Although formation of the passage 78 may be achieved in any convenient manner in the present instance the valve is formed of two stampings 84 and 86 secured together near their edges and having protrusions 88 formed in each stamping and spot welded together as at 90 to form the tortuous passage 78 therebetween while the valve shafts 54 and 56, which are formed integral with the valve plate 52, have the passages 80 and 82 formed therethrough to communicate with the passage 78. The passage 80 opens to the atmosphere and has a cap 92 secured thereover with openings 94 formed in the cap to allow for the ingress of air to the passage.

Interconnected passages 96 and 98 are formed through the member 34 and communicate with the passage 78 through an aperture 100 formed in the end bearing 70. A section of insulated flexible tubing 102 is connected between the passage 98 and a temperature responsive control element or choke valve mechanism 104 associated with the engine carburetor 24. The control element 104 has a chamber 105 with a thermostatic element 106 disposed therein which is employed for operating the choke valve of the carburetor 24 in a well known manner. The chamber 105 communicates with the intake manifold 26 through a passage 108 formed in the carburetor 24. The passage 108 communicates with the intake manifold 26 beyond the engine throttle through an opening 110.

When the cold engine is started, the exhaust gas from the manifold 16 flows through the exhaust conduit 28 and against the valve plate 52 which at such time is vertically positioned across the chamber 38 and in alignment with the dividing wall 48 of the passage member. The hot engine exhaust gas is diverted by the valve plate through the passage 46 of the passage member, and about the intake manifold 26 where heat is given off by the gases to the combustible charge flowing therethrough. The exhaust gas flows out of the passage 44 behind the valve plate 52, and through the remaining portion of the exhaust system. At the same time, the induction of air through the engine carburetor 24 creates a suction through the flexible tubing 102 to induce the flow of cool air through the valve plate 52. The heat of the exhaust gas about the valve plate 52 is transferred by the air flowing through the tortuous passage 78 to the temperature responsive control element 104 about the thermostatic element 106 to operate the choke mechanism. The air then flows beyond the element 104 and into the engine induction system through passage 108 and opening 110.

The flow of exhaust gases against the valve plate 52 warms the valve structure to a temperature which will cause the bimetal element 72 to contract or expand as the case may be. The bimetal element 72 then acts upon the valve shaft 54 to position the valve plate 52 horizontally across the chamber 38, allowing for the uninterrupted flow of exhaust gases through the upper portion 40 of the chamber and cutting off the flow of gases through the lower portion 42 of the chamber and about the induction system.

As long as the engine is being operated the cool air continues to flow through the valve structure 50, cooling the bearings 62 and 64 and the valve plate 52, and transferring the heat therefrom to the temperature responsive element 104 associated with the engine carburetor 24. When the engine is stopped and left inoperative for a period of time the bimetal spring 72 cools and returns the valve plate 52 to its vertical position ready to repeat the steps outlined above.

I claim:

1. In an engine having an exhaust system and a charge forming device disposed in heat exchanging relation to a portion of said exhaust system, a bypass valve mounted in said exhaust system for controlling the flow of exhaust gases therethrough, temperature responsive mixture control means associated with said charge forming device, and heat transfer means connected between said bypass valve and said mixture control means for actuating said mixture control means.

2. In an engine having exhaust means and a charge forming device disposed in heat exchanging relation to a portion of said exhaust means, a bypass valve mounted within said exhaust means for controlling the flow of exhaust gases therethrough, temperature responsive mixture control means in association with said charge forming device, and a heat transfer passage formed through said bypass valve and in communication with said mixture control means for transferring the heat of said exhaust gases from said bypass valve to said mixture control means.

3. In an engine having exhaust means and a charge forming device, an exhaust conduit in communication with said exhaust means and in heat exchanging relation to said charge forming device, a bypass valve mounted within said exhaust conduit for controlling the flow of exhaust gases therethrough, a temperature responsive mixture control means associated with said charge forming device, and heat transfer means connected between said bypass valve and said mixture control means for operatively controlling said mixture control means.

4. In an engine having an exhaust system and a charge forming device including temperature responsive mixture control means, said charge forming device being disposed in heat exchanging relation to a portion of said exhaust system, a bypass valve mounted within said exhaust system for controlling the flow of exhaust gases therethrough, a passage formed through said bypass valve, and means in communication with said passage and said mixture control means for transferring the heat of said exhaust gases from said bypass valve to said mixture control means.

5. In an engine having exhaust means and a charge forming device in heat exchanging relation to a portion of said exhaust means, said charge forming device including temperature responsive mixture control means, a bypass valve mounted within said exhaust means for controlling the flow of exhaust gases therethrough, a tortuous passage formed through said bypass valve and in communication with said mixture control means, said passage being in heat exchanging relation to said exhaust gases, and means associated with said passage for transferring the heat of said exhaust gases from said bypass valve to said mixture control means.

6. In an engine having exhaust means and a charge forming device including temperature responsive mixture control means, an exhaust conduit connected to said exhaust means and disposed in heat exchanging relation to said charge forming device, a bypass valve mounted within said exhaust conduit for controlling the flow of exhaust gases therethrough, a tortuous passage formed through said bypass valve and in heat exchanging relation to said exhaust gases, said passage being open to the atmosphere at one end thereof, and means communicating between the other end of said passage and mixture control means for transferring the heat of said exhaust gases from said bypass valve to said mixture control means.

7. In an engine having exhaust means and a charge forming device including temperature responsive mixture control means, an exhaust conduit connected to said exhaust means and disposed in heat exchanging relation to said charge forming device, a bypass valve mounted within said exhaust conduit for controlling the flow of exhaust gases therethrough, a passage formed through said valve and having one end thereof in communication with the atmosphere, and means associated with the intake system of said engine and disposed between the other end of said passage and said mixture control means for transferring the heat of said exhaust gases to said mixture control means during the operation of said engine.

8. A valve for use within the exhaust system of an engine for controlling the flow of exhaust gases therethrough, a heat transfer passage formed through said valve and in communication with the atmosphere, and means associated with the intake system of said engine and adapted to be connected to said passage for transferring the heat of said exhaust gases from said valve during the operation of said engine.

9. A valve for use within the exhaust system of an engine for controlling the flow of exhaust gases therethrough, a temperature responsive control element associated with said engine, and means disposed between said valve and said control element for transferring the heat of said exhaust gases from said valve to said control element.

10. A valve for use within the exhaust system of an engine for controlling the flow of exhaust gases therethrough, a temperature responsive control element associated with said engine, a heat transfer passage formed through said valve and in communication with said control element, and means associated with the intake system of said engine and in communication with said passage for transferring the heat of said exhaust gases from said valve and to said control element during the operation of said engine.

11. In an engine having an intake system and an exhaust system, a valve disposed within said exhaust system, means for actuating said valve to control the flow of exhaust gases through said exhaust system, a temperature responsive control element associated with said intake system, a passage formed through said valve and in communication with said control element, and means communicating between said passage and said intake system for transferring the heat of said exhaust gases from said valve to said control element.

12. A valve housing adapted to be secured within the exhaust system of an engine and including a valve disposed therein for controlling the flow of exhaust gases therethrough, said valve being formed to provide axially aligned shafts having spherical bearings disposed about said shaft and within openings formed through said housing, a heat transfer passage formed through said shafts and said valve, and means adapted to be connected to said passage for transferring the heat of said exhaust gases from said valve.

13. A valve housing adapted to be secured within the exhaust system of an engine, a temperature repsonsive valve disposed within said housing for controlling the flow of exhaust gases therethrough, said valve having axially aligned shafts received within openings provided through said housing, spherical bearings disposed about said shafts and within said openings, a passage formed through said shafts and through said valve, one end of said passage being open to the atmosphere and the other end of said passage being adapted for connection to the intake system of said engine.

14. A valve housing adapted to be secured within the exhaust system of an engine, a valve disposed within said housing, means for actuating said valve to control the flow of exhaust gases through said housing, valve shafts secured to said valve and axially aligned and disposed within openings provided through said housing, spherical bearings disposed about said shafts and within said openings, a heat transfer passage formed through said shafts and said valve, one end of said passage being open to the atmosphere and the other end being adapted to communicate with the intake system of said engine for the induction of air through said passage during the operation of said engine.

15. In an engine having exhaust means and a charge forming device disposed in heat exchanging relation to said exhaust means, a bypass valve mounted within said exhaust means for controlling the flow of exhaust gases therethrough, said valve being formed to provide axially aligned shafts disposed within openings provided through said exhaust means, spherical bearings disposed about said shafts and within said openings, means connected to said valve for controlling the flow of exhaust gases through said exhaust means, a passage formed through said shafts and said valve, one end of said passage being open to the atmosphere and the other end of said passage being adapted to communicate with the intake system of said engine for the induction of air through said passage during the operation of said engine.

16. In an engine having exhaust means and a charge forming device including a temperature responsive mixture control element, an exhaust conduit in communication with said exhaust means and in heat exchanging relation to said charge forming device, a valve housing secured within said exhaust conduit, a valve plate transversely disposed across said housing and being formed to provide axially aligned shafts disposed within openings provided through said housing, spherical bearings disposed about said shafts and within said openings, means connected to one of said shafts for actuating said valve plate to control the flow of exhaust gases through said conduit, a heat transfer passage formed through said shafts and through said valve plate, one end of said passage being open to the atmosphere and the other end thereof being in communication with said control element, and means associated with the intake system of said engine and with said passage for inducing the flow of air through said valve and for transferring the heat of said exhaust gases from said valve to said control element upon operation of said engine.

17. A flow control valve including a pair of sheet metal stampings peripherally secured together and having a coolant passage formed therebetween, baffle means formed from said stampings and extended within said passage to provide elongated dividing walls, axially aligned hollow supporting shafts formed from said stampings for pivotally mounting said valve within a flow conduit, said coolant passage being adapted to communicate with the atmosphere through one of said hollow shafts and with flow inducing means through the other of said hollow shafts.

18. A flow control valve comprising a pair of complementary sheet metal stampings peripherally secured together and including coaxial tubular pivot support means, a coolant passage formed between said stampings and communicating with the atmosphere through said tubular support means, and baffle means for diverting coolant flow through said valve over the inner surfaces thereof, said baffle means being provided by securing said stampings together at selected intermediate positions to form elongated dividing walls transversely of the coolant flow through said valve.

19. A flow control valve comprising a pair of sheet metal stampings peripherally secured together and formed to provide coaxial hollow pivot shafts, a coolant passage formed between said stampings and commmunicating with the atmosphere through said hollow pivot shafts, and a plurality of elongated dividing walls formed from said stampings and extended within said coolant passage, said walls being adapted to divert the flow of coolant through said valve over the internal surfaces thereof.

References Cited in the file of this patent

UNITED STATES PATENTS

| | | |
|---|---|---|
| 1,998,636 | Porter | Apr. 23, 1935 |
| 2,108,639 | Bicknell | Feb. 15, 1938 |
| 2,226,011 | Murphy | Dec. 24, 1940 |